(12) United States Patent
Gunn et al.

(10) Patent No.: US 10,116,749 B2
(45) Date of Patent: Oct. 30, 2018

(54) METHOD FOR PROVIDING FLIGHT MANAGEMENT SYSTEM DATA TO PERIPHERAL DEVICES

(71) Applicant: The Boeing Company, Chicago, IL (US)

(72) Inventors: Peter Gunn, Redmond, WA (US); Daniel J. Murray, Mill Creek, WA (US); Patricia Suzan Ness, Seattle, WA (US); Bradley D. Cornell, Lake Stevens, WA (US); Katie Younkin, Everett, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 14/841,232

(22) Filed: Aug. 31, 2015

(65) Prior Publication Data

US 2017/0063995 A1    Mar. 2, 2017

(51) Int. Cl.

| G06F 15/16 | (2006.01) |
|---|---|
| H04L 29/08 | (2006.01) |
| G06Q 10/08 | (2012.01) |
| G06Q 10/10 | (2012.01) |
| G06Q 30/06 | (2012.01) |
| B60R 16/023 | (2006.01) |

(52) U.S. Cl.
CPC ............ *H04L 67/12* (2013.01); *B60R 16/023* (2013.01); *G06Q 10/087* (2013.01); *G06Q 10/10* (2013.01); *G06Q 30/0635* (2013.01)

(58) Field of Classification Search
USPC .................. 709/201, 230; 340/947; 350/961; 711/105
See application file for complete search history.

(56) References Cited

U.S. PATENT DOCUMENTS

| 6,173,159 | B1 * | 1/2001 | Wright ............... | H04B 7/18506 340/3.5 |
|---|---|---|---|---|
| 6,317,659 | B1 | 11/2001 | Lindsley et al. | |
| 6,694,249 | B1 * | 2/2004 | Anderson .............. | G01C 23/00 340/947 |
| 7,055,420 | B1 * | 6/2006 | Lois ........................ | F41H 11/02 342/45 |
| 7,177,939 | B2 * | 2/2007 | Nelson ............... | H04B 7/18506 701/3 |
| 7,437,225 | B1 * | 10/2008 | Rathinam ............ | G08G 5/0013 340/961 |
| 9,269,205 | B1 * | 2/2016 | Lamkin .................. | G06Q 10/04 |

(Continued)

OTHER PUBLICATIONS

European Patent Office; Extended European Search Report for European Application No. 16178963.1 dated Jan. 2, 2017, 7 pages.

*Primary Examiner* — Tammy Nguyen

(74) *Attorney, Agent, or Firm* — Peter B. Stewart; Moore & Van Allen PLLC

(57) ABSTRACT

A flight management system may include a processor, a memory, a network communication interface, and a flexible data interface stored in the memory and executable by the processor. The flexible data interface is typically configured for providing an abstract data interface layer; retrieving, via the abstract data interface layer, data stored in the memory of the flight management system; and transmitting, via the network communication device, the data to a peripheral device in network communication with the flight management system.

19 Claims, 3 Drawing Sheets

(56) References Cited

U.S. PATENT DOCUMENTS

| | | | |
|---|---|---|---|
| 2003/0023740 A1* | 1/2003 | White | H04L 29/06 709/230 |
| 2003/0220987 A1 | 11/2003 | Pearson | |
| 2004/0006412 A1* | 1/2004 | Doose | G01C 21/26 701/10 |
| 2008/0010005 A1* | 1/2008 | Small | G08G 5/00 701/120 |
| 2008/0010107 A1* | 1/2008 | Small | G06Q 10/06 705/1.1 |
| 2008/0046167 A1* | 2/2008 | Small | G06Q 10/00 701/120 |
| 2011/0118907 A1* | 5/2011 | Elkins | B64B 1/00 701/3 |
| 2011/0238239 A1 | 9/2011 | Shuler et al. | |
| 2013/0035848 A1* | 2/2013 | Burgin | G09B 5/06 701/415 |
| 2015/0095564 A1* | 4/2015 | Benedict | G11C 11/4087 711/105 |
| 2016/0155435 A1* | 6/2016 | Mohideen | G08G 5/0013 704/235 |
| 2016/0362190 A1* | 12/2016 | Royster | G01C 1/00 |
| 2017/0018125 A1* | 1/2017 | Jover | G07C 5/085 |
| 2017/0063995 A1* | 3/2017 | Gunn | B60R 16/023 |

\* cited by examiner

METHOD FOR PROVIDING FLIGHT MANAGEMENT SYSTEM DATA TO PERIPHERAL DEVICES

BACKGROUND

A flight management system of an aircraft is used to manage the flight path of an aircraft. That said, a need exists for an improved flight management system.

SUMMARY

In one aspect, the present disclosure embraces a flight management system.

In one embodiment, the flight management system includes a processor, a memory, a network communication interface, and a flexible data interface stored in the memory and executable by the processor. The flexible data interface is typically configured for providing an abstract data interface layer; retrieving, via the abstract data interface layer, data stored in the memory of the flight management system; and transmitting, via the network communication device, the data to a peripheral device in network communication with the flight management system.

In some embodiments, the flexible data interface is configured for determining that a trigger event has occurred, and retrieving the data stored in the memory comprises retrieving the data stored in the memory based on determining that the trigger event has occurred.

In some embodiments and in combination with any of the above embodiments, the trigger event is associated with a status of an aircraft.

In some embodiments and in combination with any of the above embodiments, the trigger event comprises receiving a request for the data from the peripheral device.

In some embodiments and in combination with any of the above embodiments, the abstract data interface layer identifies a location of the data in the memory.

In some embodiments and in combination with any of the above embodiments, retrieving the data stored in the memory and transmitting the data to a peripheral device is based on a configuration file stored in the memory, the configuration file identifying the data and the peripheral device.

In some embodiments and in combination with any of the above embodiments, transmitting the data to the peripheral device comprises transmitting the data to the peripheral device via an onboard network system of an aircraft.

In some embodiments and in combination with any of the above embodiments, the peripheral device is a laptop, electronic flight bag, tablet computer, or mobile device.

In another aspect, the present disclosure embraces a method of providing data from a flight management system to a peripheral device. In one embodiment, the method includes: providing, via a computer processor, an abstract data interface layer; retrieving, via a computer processor, data stored in a memory of the flight management system; and transmitting, via a network communication device, the data to a peripheral device in network communication with the flight management system.

In yet another aspect, the present disclosure embraces a computer program product for providing data from a flight management system to a peripheral device. In one embodiment, the computer program product comprises a non-transitory computer-readable storage medium having computer-executable instructions for: providing an abstract data interface layer; retrieving data stored in a memory of the flight management system; and transmitting the data to a peripheral device in network communication with the flight management system.

BRIEF DESCRIPTION OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
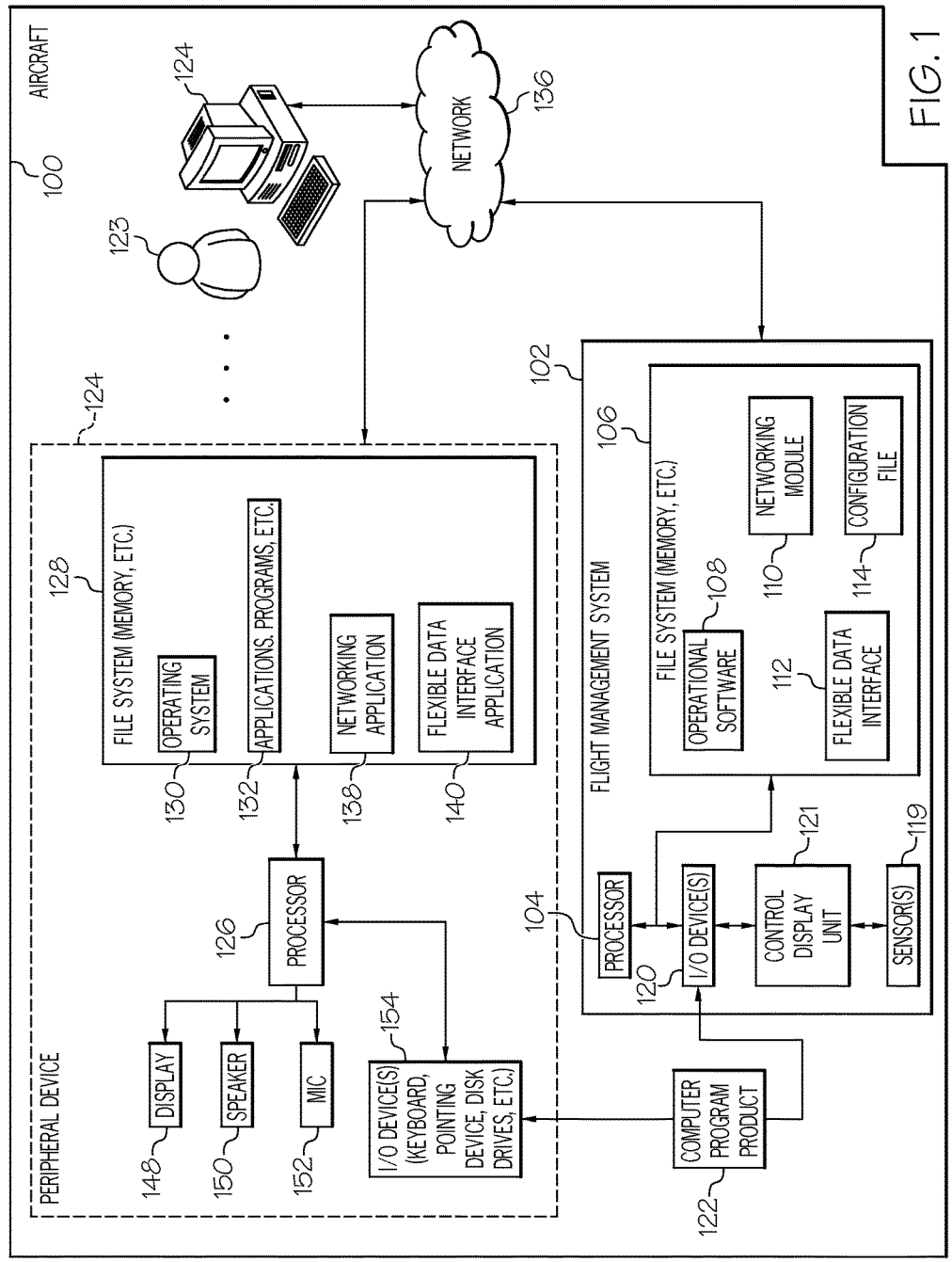
FIG. 1 depicts a flight management system in accordance with an embodiment of the present disclosure.

The embodiments described herein may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Flight management systems generate large amounts of data. However, only a limited subset of such data is available to other devices and systems. Moreover, this data is only available to devices and systems connected to a relevant data bus. In addition, much of the data within a flight management system is transient, and so such data may not be preserved in a flight management system for later access.

Accordingly, the present disclosure embraces a flight management system having a flexible data interface. The flexible data interface is typically configured to abstract data created or received by the flight management system and then make this abstracted data available to other devices.

FIG. 1 is a block schematic diagram of an example of a flight management system 102 on an aircraft 100 in accordance with an embodiment of the present disclosure. The flight management system 102 may be in communication with one or more peripheral devices 124 via a network 136.

The flight management system 102 may include one or more computers, servers, or similar processing devices, such as one or more flight management computers. The flight management system 102 may include a processor 104 for controlling operation of the flight management system 102 for performing functions, such as those described herein with respect to providing data from the flight management system 102 to peripheral devices. The flight management system 102 may also include a file system 106 or memory. Operational software 108, applications and other programs may be stored on the file system 106 for running or operating on the processor 104. The operational software 108 is typically configured to automate numerous in-flight tasks (e.g., navigation and flight plan management). The operational software 108 typically receives flight information (e.g., from various aircraft sensors 119 in communication with the flight management system 102). The operational software 108 may then provide information, such as maps, charts, headings, locations, flight plans, and/or other suitable types of information used to operate aircraft. For example, the operational software 108 may provide information to a pilot via a control display unit 121 and/or an electronic flight instrument system. The operational software 108 is typically configured to employ flight information it receives (e.g., sensor data) to determine some of the information it provides (e.g., navigational information). A networking module 110 or system may also be stored on the file system 106 and may be compiled and run on the processor 104 to perform the function of allowing the flight management system 102 to communicate with other devices similar to those described herein. The networking module 110 may be any type of communications mechanism for network communications.

A flexible data interface 112 may also be stored on the file system 106. In one embodiment, the flexible data interface 112 may be located on a server that communicates with one or more flight management computers. Aspects of the methods 200 or 250 of FIGS. 3A-3B may be embodied in the flexible data interface 112 and may be performed by the processor 104 when the flexible data interface 112 is compiled and run on the processor 104. The flexible data interface 112 may operate in association with the networking module 110 and other types of communications media to perform the functions and operations associated with the method 200. In another embodiment, the flexible data interface 112 may be a component of the networking module 110 and may operate in association with the networking module 110 and other communications media.

One or more configuration files 114 may also be stored on the file system 106. The configuration files 114 may be used by the flexible data interface 112 to control what data is provided to one or more peripheral devices 124 (e.g., to an application on a peripheral device). In another embodiment, the configuration files 114 may be a component of the networking module 110.

The flight management system 102 may also include one or more input devices, output devices or combination input/output devices, collectively I/O devices 120. The I/O devices 120 may include, but are not necessarily limited to, a keyboard or keypad, pointing device, such as a mouse, disk drive and any other devices to permit a user to interface with and control operation of the flight management system 102 and to communicate with other devices and systems. For example, the I/O devices 120 may include a network communication device to allow the flight management system 102 to communicate with the network 136. Typically, the I/O devices 120 include aircraft sensors 119, a control display unit 121, and an electronic flight instrument system. At least one of the I/O devices 120 may be a device to read a computer program product, such as computer program product 122. The computer program product 122 may be similar to that described in more detail herein. The networking module 110 and the flexible data interface 112 may be loaded on the file system 106 from a computer program product, such as computer program product 122.

The peripheral device(s) 124 may be any type of device that can receive data from the flexible data interface 112 via network communication and then process the data. A peripheral device may be a laptop, an electronic flight bag, a tablet computer, or a mobile or handheld computer or communications device. A user 123 may use the peripheral device(s) 124 (e.g., via an application stored on a peripheral device) independently or to access data provided by the flexible data interface 112. In some embodiments, the user 123 may use the peripheral device(s) 124 to interact with the flexible data interface 112. The peripheral device(s) 124 may include a processor 126 to control operation of the peripheral device(s) 124 and a file system 128, memory or similar data storage device. An operating system 130, applications 132 and other programs may be stored on the file system 128 for running or operating on the processor 126. A networking application 138 may also be stored on the file system 128 and operate on the processor 126 of the peripheral device(s) 124. The networking application 138 may be configured to allow the peripheral device(s) 124 to communicate with the flexible data interface via the network 136. In typical embodiments, the network 136 is an onboard network system of the aircraft 100. In some embodiments, the network 136 may be or include the Internet, an intranet or other private or proprietary network.

In accordance with an embodiment, a flexible data interface application 140 may also be stored on the file system 128. Aspects of the methods 200 or 250 of FIGS. 3A-3B may be embodied and performed by the flexible data interface application 140. In accordance with another embodiment, the flexible data interface application 140 may be part of the networking application 138.

The flexible data interface application 140 operating on the peripheral device(s) 124 may interface with or operate in conjunction with the flexible data interface 112 on the flight management system 102 to perform the functions and operations described herein for receiving and processing data from the flexible data interface 112. Accordingly, the flexible data interface application 140 operating on the peripheral device(s) 124 may perform some of the functions and operations of the method 200 and the flexible data interface 112 operating on the flight management system 102 may perform other functions of the method 200.

The peripheral device(s) 124 may also include a display 148, a speaker system 150, and a microphone 152 for voice communications. One or more user interfaces may be presented on the display 148 for controlling operation of the peripheral device(s) 124 (e.g., for controlling operation of the flexible data interface application 140) and for performing the operations and functions described herein.

The peripheral device(s) 124 may also include one or more input devices, output devices or combination input/output devices, collectively I/O devices 154. The I/O devices 154 may include a keyboard or keypad, pointing device, such as a mouse, disk drives and any other devices to permit a user, such as user 123, to interface with and control operation of the peripheral device(s) 124 and to access the flexible data interface 112 on the flight management system 102. The I/O devices 154 may also include at least one device configured to read computer code from a computer program product, such as computer program product 122.

Figure 2:
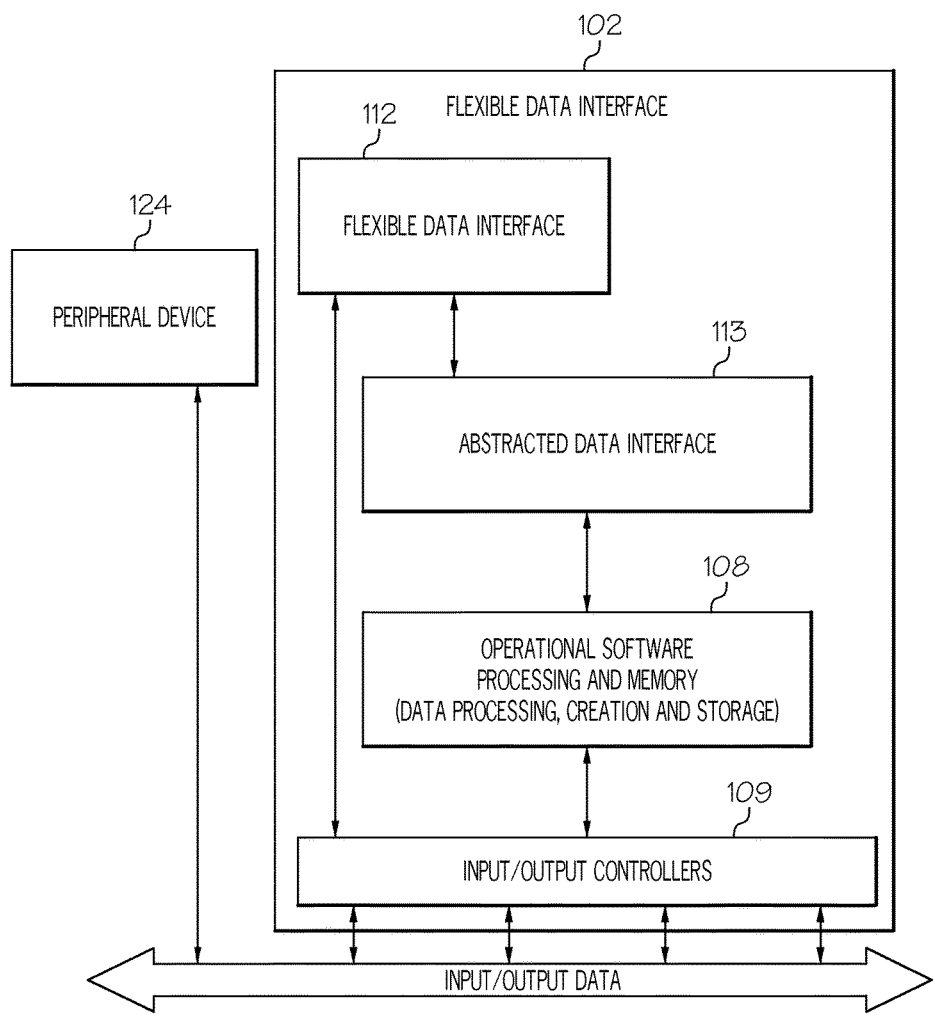
FIG. 2 schematically depicts an exemplary architecture of a flight management system in accordance with an embodiment of the present disclosure.

FIG. 2 schematically depicts an exemplary architecture of the flight management system 102. The flight management system 102 typically includes input/output controllers 109 for transmitting and receiving data. For example, the input/output controllers 109 may receive flight information from aircraft sensors 119. This data may be then provided to the operational software 108 for processing. As part of this processing, the operational software 108 typically creates additional data, such as navigational information. Data processed by the operational software 108 may then be provided by the input/output controllers 109 to other devices, such as to the control display unit 121 and/or to an electronic flight instrument system.

As noted, the flight management system 102 typically includes the flexible data interface 112, which is configured to provide data received, created, processed, and/or stored by the flight management system 102 to one or more peripheral devices 124 (e.g., via the input/output controllers 109). To facilitate the provision of data by the flexible data interface 112, the flight management system 102 typically includes an abstracted data interface 113. The abstracted data interface 113 typically includes a memory map of the data stored (e.g., in volatile or non-volatile memory) in the flight management system 102. By using the abstracted data interface 113, the flexible data interface 112 can locate specific data in the flight management system 102 and provide such data to a peripheral devices 124. In addition, by employing the abstracted data interface 113, the flexible data interface 112 can provide data in the flight management system 102 to a peripheral device 124 without impacting the operational software 108.

The configuration file(s) 114 may define rules for how the flexible data interface 112 provides data to the peripheral device(s) 124. The rules may define what types of data are provided to a particular peripheral device. The configuration file(s) 114 may be configured to support multiple rules for multiple peripheral devices. The rules may also define the frequency at which certain data is provided. In some embodiments, the rules may define one or more trigger conditions. In this regard, a trigger condition may specify that upon a trigger event being detected, the flexible data interface 112 provides specific data to a specific peripheral device. In some embodiments, the rules of the configuration file(s) (e.g., the types of data provided, the identity of the peripheral device(s), the frequency at which data is provided, and/or trigger conditions) may be defined by the manufacturer of the aircraft. In some embodiments, the rules of the configuration file(s) may be customized by a user (e.g., a pilot of the aircraft).

Figure 3A:
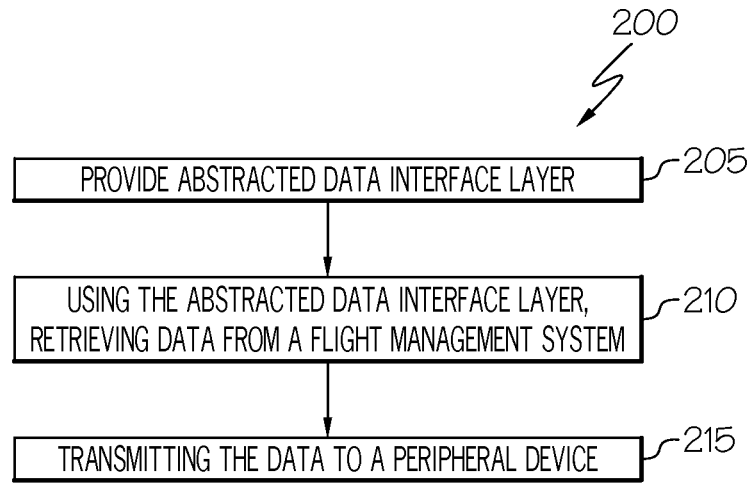
FIG. 3A depicts a method of providing data from a flight management system to one or more peripheral devices in accordance with an embodiment of the present disclosure.

FIG. 3A depicts a method 200 of providing data from the flight management system to one or more peripheral devices.

At block 205, an abstracted data interface layer is provided in a flight management system. The abstracted data interface layer typically provides an interface between a flexible data interface and data stored in the flight management system so that the flexible data interface can retrieve data stored in the flight management system. For example, the abstracted data interface layer typically identifies where specific data is located in the memory (e.g., volatile or non-volatile memory) of the flight management system.

At block 210, the flexible data interface uses the abstracted data interface layer to retrieve data from the flight management system. The data retrieved by the flexible data interface is typically defined by one or more configuration files.

At block 215, the flexible data interface provides the retrieved data to one or more peripheral devices. Typically, the configuration file(s) defines one or more peripheral devices to which the data should be provided. To provide the data to one or more peripheral devices, the flexible data interface typically transmits the data to the one or more peripheral devices via an onboard network system of an aircraft. That said, it is within the scope of the present disclosure to transmit the data to the one or more peripheral devices via any type of communication network.

In some embodiments, the configuration file(s) may also define a frequency at which certain data is retrieved by the flexible data interface from the flight management system and provided to one or more peripheral devices. For example, the configuration file(s) may specify that the flexible data interface provide a report containing predefine types of data to a predefined peripheral device at a predefined frequency.

Figure 3B:
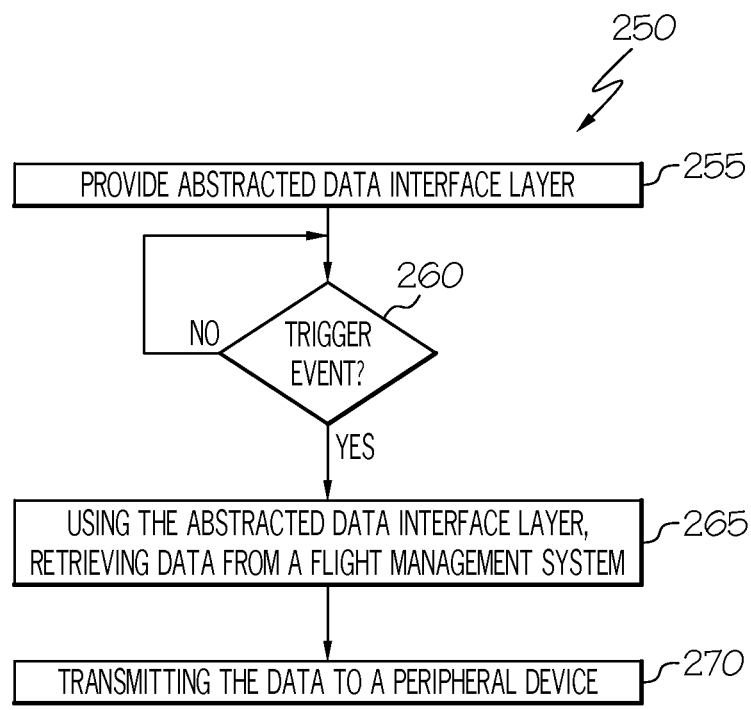
FIG. 3B depicts a method of providing data from a flight management system to one or more peripheral devices in accordance with another embodiment of the present disclosure.

As noted, the configuration file(s) may define one or more trigger conditions. In this regard, FIG. 3B depicts a method 250 of providing data from the flight management system to one or more peripheral devices based on a trigger condition.

At block 255, the abstracted data interface layer is provided in a flight management system.

At block 260, the flexible data interface determines whether a trigger event has occurred. This trigger event is typically defined by the configuration file(s). In some embodiments the trigger event may relate to the status of the aircraft. For example, the trigger event may be the speed of the aircraft reaching a predefined threshold or a particular flight plan sequence being initiated or completed. In some embodiments, the flexible data interface may provide data based on a corresponding data request from a peripheral device. Accordingly, the trigger event may be the flexible data interface receiving a data request from a peripheral device. In some embodiments, the flexible data interface may periodically provide data to a peripheral device. Accordingly, the trigger event may be a predefined time period elapsing.

Once the flexible data interface determines that the trigger event has occurred, at block 265, the flexible data interface uses the abstracted data interface layer to retrieve data from the flight management system. As noted, the data retrieved by the flexible data interface may be defined by a configuration file(s).

At block 270, the flexible data interface provides the retrieved data to one or more peripheral devices (e.g., by transmitting the data to the one or more peripheral devices via an onboard network system of the aircraft). Typically, the configuration file(s) defines one or more peripheral devices to which the data should be provided.

The flexible data interface in accordance with the present disclosure allows peripheral devices, such a laptop, electronic flight bag, tablet computer, or mobile device (e.g., smartphone), that are not connected to a relevant data bus to have access to data in the flight management system. In addition, by using an abstracted data interface layer, data in the flight management system can be accessed by the flexible data interface without impacting the performance of the flight management system's operational software. Furthermore, by the flexible data interface regularly providing data from the flight management system to one or more peripheral devices, transient data in the flight management system can be preserved by such peripheral devices.

The flowchart and block diagrams in the Figures illustrate the architecture, functionality, and operation of possible implementations of apparatuses, systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, when it is said herein that something is "based on" something else, it may be based on one or more other things as well. In other words, unless expressly indicated otherwise, as used herein "based on" means "based at least in part on" or "based at least partially on."

The corresponding structures, materials, acts, and equivalents of all means or step plus function elements in the claims below are intended to include any structure, material, or act for performing the function in combination with other claimed elements as specifically claimed. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A flight management system (102), comprising:
   a processor (104);
   a memory (106) comprising a volatile memory;
   operational software (108);
   a network communication device;
   a flexible data interface (112) stored in the memory (106), executable by the processor (104) and configured for:
      providing an abstract data interface layer (113);
      retrieving, via the abstract data interface layer (113), transient data stored in the volatile memory of the flight management system (102), wherein the abstract data interface layer (113) identifies a location of the transient data in the volatile memory, wherein the flexible data interface (112) is configured to retrieve the transient data without interfering with the operational software (108) of the flight management system (102); and
      transmitting, via the network communication device, the transient data to a peripheral device (124) in network communication with the flight management system (102).

2. The flight management system (102) according to claim 1, wherein:
   the flexible data interface (112) is configured for determining that a trigger event has occurred;
   retrieving the transient data stored in the volatile memory comprises retrieving the transient data stored in the volatile memory based on determining that the trigger event has occurred.

3. The flight management system (102) according to claim 2, wherein the trigger event is associated with a status of an aircraft (100).

4. The flight management system (102) according to claim 2, wherein the trigger event comprises receiving a request for the transient data from the peripheral device (124).

5. The flight management system (102) according to claim 1, wherein retrieving the transient data stored in the volatile memory and transmitting the transient data to a peripheral device (124) is based on a configuration file (114) stored in the memory (106), the configuration file (114) identifying the transient data and the peripheral device (124).

6. The flight management system (102) according to claim 1, wherein transmitting the transient data to the peripheral device (124) comprises transmitting the transient data to the peripheral device (124) via an onboard network system of an aircraft (100).

7. The flight management system (102) according to claim 1, wherein the peripheral device (124) is a laptop, electronic flight bag, tablet computer, or mobile device.

8. A method of providing data from a flight management system (102) to a peripheral device (124), the method comprising:
   providing, via a computer processor (104), an abstract data interface layer (113);
   retrieving, via a computer processor (104), transient data stored in a volatile memory of a memory (106) of the flight management system (102), wherein the abstract data interface layer (113) identifies a location of the transient data in the volatile memory, wherein the transient data is retrieved without interfering with operational software (108) of the flight management system (102); and
   transmitting, via a network communication device, the transient data to a peripheral device (124) in network communication with the flight management system (102).

9. The method according to claim 8, comprising determining that a trigger event has occurred;
   wherein retrieving the transient data stored in the volatile memory comprises retrieving the transient data stored in the volatile memory based on determining that the trigger event has occurred.

10. The method according to claim 9, wherein the trigger event is associated with a status of an aircraft (100).

11. The method according to claim 9, wherein the trigger event comprises receiving a request for the transient data from the peripheral device (124).

12. The method according to claim 8, wherein retrieving the transient data stored in the volatile memory and transmitting the transient data to a peripheral device (124) is based on a configuration file (114) stored in the memory (106), the configuration file (114) identifying the transient data and the peripheral device (124).

13. The method according to claim 8, wherein transmitting the transient data to the peripheral device (124) comprises transmitting the transient data to the peripheral device (124) via an onboard network system of an aircraft (100).

14. A computer program product for providing data from a flight management system (102) to a peripheral device (124), the computer program product comprising a non-transitory computer-readable storage medium having computer-executable instructions for:
   providing an abstract data interface layer (113);
   retrieving transient data stored in a volatile memory of a memory (106) of the flight management system (102), wherein the abstract data interface layer (113) identifies a location of the transient data in the volatile memory, wherein the computer-executable instructions are configured to retrieve the transient data without interfering with operational software (108) of the flight management system (102); and
   transmitting the transient data to a peripheral device (124) in network communication with the flight management system (102).

15. The computer program product according to claim 14, wherein:
   the non-transitory computer-readable storage medium has computer-executable instructions for determining that a trigger event has occurred;
   retrieving the transient data stored in the volatile memory comprises retrieving the transient data stored in the volatile memory based on determining that the trigger event has occurred.

16. The computer program product according to claim 14, wherein retrieving the transient data stored in the volatile memory and transmitting the transient data to a peripheral device (124) is based on a configuration file (114) stored in the memory (106), the configuration file (114) identifying the transient data and the peripheral device (124).

17. The computer program product according to claim 14, wherein transmitting the transient data to the peripheral device (124) comprises transmitting the transient data to the peripheral device (124) via an onboard network system of an aircraft (100).

18. The flight management system (102) according to claim 5, wherein the configuration file (114) defines a frequency at which the flexible data interface (112) transmits the transient data to the peripheral device (124).

19. The flight management system (102) according to claim 3, wherein retrieving the transient data stored in the volatile memory and transmitting the transient data to a peripheral device (124) is based on a configuration file (114) stored in the memory (106), the configuration file (114) identifying the transient data, the trigger event, and the peripheral device (124).

\* \* \* \* \*